Aug. 11, 1959 — H. S. STINSON — 2,898,701
ATTACHMENT FOR FISHHOOKS
Filed March 12, 1957

INVENTOR.
Harold S. Stinson

United States Patent Office 2,898,701
Patented Aug. 11, 1959

2,898,701

ATTACHMENT FOR FISHHOOKS

Harold S. Stinson, Town and Country, Mo.

Application March 12, 1957, Serial No. 645,619

9 Claims. (Cl. 43—44.6)

The invention has to do with the art of fishing and relates more particularly to that type of the fishing art where live minnows are used for bait and it consists substantially in the method of attaching a live minnow to a fish hook through the employment of such features of construction, arrangement, and combination of parts as will hereinafter be described and distinctly claimed.

The following are among the objects of the invention.

To provide an improved method for attaching a minnow to a fish hook without piercing the burr of the fish hook through the body of the minnow; to provide a simple and inexpensive combination of two well known elements to produce a novel means for attaching a minnow to a fish hook; to provide a more secure attachment of a minnow to a fish hook; to provide a more confortable attachment of the minnow to the fish hook to increase its life expectancy while being used as bait; to provide a means for attaching a minnow to a fish hook that will not restrict it's free movement so that it may use all it's natural means of swimming freely in water; to provide a device which will make it possible to attach a minnow in different positions in relation to the fish hook; and, to provide certain details of improved construction, arrangement, and combination of parts as will hereinafter become apparent to those skilled in the art.

While the mechanical method of achieving this novel result may be varied or modified in many ways, it is my intention in this application to give simple diagrammatic illustration of the method basically involved so that those skilled in the art will understand the principles of the invention, but I do not limit the invention to the embodiment shown.

Figure 1:
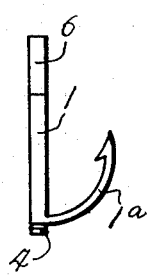
Figure 1 is a side elevation of the present form of the invention showing a fish hook with its minnow attaching clamp.

In referring to the drawings and describing the invention in its preferred embodiments I will divide the invention into its two principal elements. The first element being what I will hereinafter refer to as a clamping device and the second element being what I will hereinafter refer to as a fish hook arrangement. I will first explain in detail the purpose and design of each element.

*Clamping device*

Figure 2:
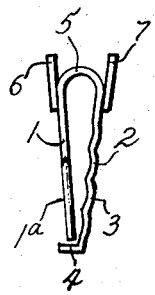
Figure 2 is a front elevation showing the parts thereof in their normal position.
Figure 3:
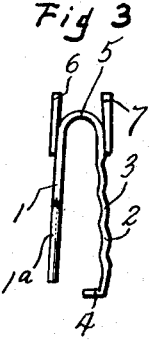
Figure 3 is another front elevation thereof showing the jaws of the minnow attaching clamp in an "open" position.

This element which I prefer to regard as a clamping device is composed of two members 1 and 2 which for convenience I will term jaws of the clamping device. It is apparent that these two jaws need not be confined to any particular size or shape. In the present form of the invention I have shown jaw 1 to have a straight shank, while the shank of jaw 2 has a crinkled portion 3. This crinkled portion is for the purpose of preventing the escape of a minnow from the clamping device. It is apparent that any well known non-slipping agent could be employed without deviating from the spirit of the invention or the scope of my claims. In actual practice I have found that by having one of the jaws of the clamping device crinkled is sufficient to securely fasten the minnow. The lower extremity 4 of jaw 2 is bent at an angle. This angle forms a stop and effectually prevents a minnow from slipping out of the jaws of the clamping device. Reference being had to Figures 1, 2, and 3.

In the present form I employ a simple curved spring 5 to connect the upper ends of the jaws 1 and 2; and, since the spring 5 shown in the drawings is integral with the jaws 1 and 2 it effectually holds them together in operative alignment and at the same time urges them to be normally in a closed position as shown in Figure 2. It will be apparent from the description which follows that in actual practice the two jaws of the clamping device are caused to be opened, or spread apart, for the introduction or insertion of a minnow between the inner surfaces of the jaws 1 and 2; and, after the minnow has been placed in the desired position in relation to the inner surfaces of the jaws 1 and 2, through the influence of the spring 5 they will close, or tighten, around the body of the minnow and hold it securely. It is evident that any type of spring mechanism which will hold the jaws 1 and 2 together in operative alignment and permit them to be opened or closed at will is within the spirit of the invention.

Secured to each side of the spring 5 by any suitable method such as soldering or rivets, in the present case soldering, are two oblong shaped ears 6 and 7 which extend upwardly of the spring 5. These two ears 6 and 7 may be considered as extensions of the jaws 1 and 2 respectively. It will be seen that by placing the ears 6 and 7 between the thumb and forefinger of a hand and exerting pressure the influence of the spring 5 on the jaws 1 and 2 will be nullified and if enough pressure is applied to the ears 6 and 7 the jaws 1 and 2 of the clamping device will be caused to be opened, or spread apart, as shown in Figure 3; and, when the pressure is released the spring will cause the jaws 1 and 2 to come together again in a closed position as shown in Figure 2. It will thus be seen that the jaws 1 and 2 may in this manner be manually operated.

Because of the construction of the invention and the arrangement of its parts, those skilled in the art will understand that the ears 6 and 7 may be dispensed with and not employed in the operation of the clamping device. By referring to the drawings it will be noted that the connection of the upper extremities of the jaws 1 and 2 is accomplished by a curved spring connection 5, which is shaped as shown in the drawings as a segment of a circle which effectually holds the upper ends of the jaws 1 and 2 in a spaced apart relationship. In the present embodiment of the invention, the shanks of the jaws 1 and 2 extend downwardly from the point of their connection with the extremities of the curved spring in a tapering manner in a line at a tangent to the curve of the spring connection. This construction, obviously, permits a minnow to be inserted between the spaced apart upper portions of the jaws 1 and 2, without first opening the jaws as in the previous hereinabove explained embodiment of the invention. The inserted minnow may then be manually moved downward between the shanks of the jaws 1 and 2, and, because of their tapering relationship, the jaws will be wedged apart to accommodate the body of the minnow. In this manner the body of a minnow may be positioned between lower portions of the said jaws of the clamp so that it will be adjacent the bend of the fish-hook. This embodiment is contemplated as within the scope of the present invention.

*Fish-hook arrangement*

Figure 4:
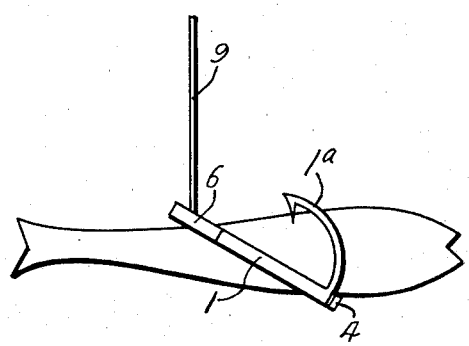
Figure 4 is a side elevation of the invention secured to the body of a minnow (shown in outline) in a position in relation to the minnow illustrating a desirable application of the invention.
Figure 5:
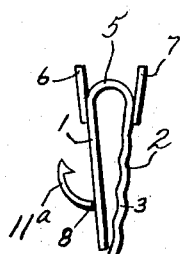
Figure 5 is a side elevation of a simple modification of the invention.

The second element of the invention is the mechanism for hooking fish which I have called the fishhook arrangement. In drawings designated by the numerals 1, 2, 3, and 4 I have shown the preferred location and position of a fish hook. The fish hook is secured to the lower extremity of jaw 1 and forms an integral part of jaw 1. It is positioned as shown in Figures 1 and 4, that is to say that the burr of the fish hook is forward of the jaw 1. It should be clear to anyone familiar with the art that a fish hook, or even more than one fish hook, could be attached to either jaw of the clamping device; and, that the fish hook, or hooks, could occupy a variety of positions in relation to the clamping device and they could be attached to the clamping device at various points along the surface of the clamping device with equal results and what some may consider better results. These modifications are also contemplated as within the scope of the invention. Figure 5 illustrates one of these modifications. In this modification of the fish hook arrangement all of the parts of the clamping device are unchanged, however the fish hook 11a is attached to jaw 1 at a point designated 8 and is as shown in Figure 5 is perpendicular to jaw 1.

*Mode of operation*

In actual practice a minnow is placed in the palm of one hand and secured by the fingers and thumb of that hand in a position suitable to the fisherman. The present invention is operated by the other hand. The ears 6 and 7 are grasped between the thumb and forefinger and pressure is exerted on the ears 6 and 7 to open the minnow clamp. After the jaws 1 and 2 are thus opened, they are placed over the body of the minnow which is being held by the other hand, the pressure being exerted by the thumb and forefinger is now released, the jaws 1 and 2 of the clamping device close around the body of the minnow and will hold it securely. Figure 4 illustrates the outline of a minnow secured by the clamping device. The fisherman attaches his fishing line 9 to the spring 5 and is ready to go fishing. The mode of operation of the invention wherein it is modified to dispense with the ears 6 and 7 has been previously described.

It is to be understood that the foregoing description and the accompanying drawings have been given only by way of illustration and example, and that changes and alterations in the present disclosure, which will be readily apparent to one skilled in the art, are contemplated as within the spirit of the present invention and the scope of the claims.

What I claim is:

1. In combination, a fish-hook having a pair of similar shanks, a curved spring adapted to space apart and connect the upper extremities of said shanks, both shanks being tangent to the curved spring so that the lower portions of the shanks are aligned and normally in abutting engagement and forming a tapered opening, the bend and burr of a fish-hook attached to the lower extremity of one of the shanks, and a portion of the other shank formed to engage the body of a minnow.

2. A fish-hook made of a single piece of spring-like material bent between its extremities to form a segment of a circle, said segment adapted to space apart the upper ends of the two relatively straight, substantially equal length shanks which extend from the extremities of said segment at a tangent to its curve, so that their lower portions are aligned and normally bear against each other in abutting engagement to form a tapered opening between the shanks, a fish-hook formed at the extremity of one of the shanks, and a portion of the other shank formed to engage the body of a minnow.

3. In combination, a fish-hook having a shank, a jaw of a clamp having a shank of similar shape and substantially of equal length as the said fish-hook shank, a curved spring adapted to space apart and connect the upper extremities of both shanks, the respective shanks connected to the said curved spring in a line tangent to its curve so that their lower portions will be aligned and normally pressed together in abutting engagement to form a tapered opening between the shanks, a bend and a burr of a fish-hook extending from the lower extremity of the shank of the fish-hook substantially at right angles to the plane of the segment of a curve connection, and a formation of the lower portion of the jaw shank adapted to engage the body of a minnow.

4. A minnow attaching element for a fish-hook, comprising a clamping member of spring-like material bent to form two opposing jaws, the upper ends of the jaws are spaced apart while the bottom portions of the jaws are normally together in abutting engagement thereby forming a tapered opening, the spring-like material is bent between the jaws and forms a fishing line-attaching end, the said jaws are adapted to clamp the body of a minnow by extending along its sides, one of the jaws is straight in its entirety and has a bend and a burr of a fish-hook attached to its lower extremity lying substantially at right angles to the plane of the forked clamping member, the other jaw being straight from the line-attaching end and then has a crinkle toward its free end, where it is bent at an angle in the direction of the first jaw and said angle normally occupying a position under the lower end of the first jaw.

5. In combination, a fish-hook made of a single piece of spring-like material bent between its extremities to form a segment of a circle, a fish-hook formed at one extremity having the bend of the hook positioned substantially at right angles to the plane of said segment of a circle, a formation of a portion of the other extremity positioned to engage the body of a minnow, relatively straight shanks formed at a tangent to the curve of said segment of a circle and joining the two extremities so that they are normally aligned in opposition and bear against one another in abutting engagement and finger pieces attached to the upper portions of each shank and adapted to extend above said segment of a circle.

6. In combination, a clamp made of a single piece of spring-like material bent between its extremities to form a segment of a circle, the two extremities of said segment of a circle extending in a line tangent to said circle to form similarly shaped jaws of a clamp substantially of equal length, the lower portions of the jaws are aligned in opposition and normally pressed together in abutting engagement so as to form a tapered opening between the jaws, upwardly extending finger pieces attached to the outside upper portions of each jaw, and a fish-hook attached to one of the jaws of the clamp.

7. In combination, a fish-hook having a pair of similar shanks, a curved spring adapted to space apart and connect the upper extremities of said shanks and forming a curved opening above the upper extremities of the said two shanks, both shanks being tangent to the curved spring so that their lower portions of the shanks are aligned and normally in abutting engagement and forming a tapered opening, the bend and burr of a fish-hook attached to the lower extremity of one of the shanks, and a portion of the other shank formed to engage the body of a minnow.

8. A fish-hook made of a single piece of spring-like material bent between its extremities to form a segment of a circle, said segment adapted to space apart and form a segment of a circle opening above the upper ends of two relatively straight, substantially equal length shanks which extend from the extremities of said segment at a tangent to its curve, so that their lower portions are aligned and normally bear against each other in abutting engagement to form a tapered opening between the shanks, a fish-hook formed at the extremity of one of the shanks, and a portion of the other shank formed to engage the body of a minnow.

9. In combination, a fish-hook having a pair of similar shanks, a curved spring adapted to space apart and connect the upper extremities of said shanks, both shanks being tangent to the curved spring so that the lower portions of the shanks are aligned and normally in abutting engagement, and forming a curved opening above the upper extremities of the said two shanks and a tapered opening between the shanks, so that a minnow may be placed in the openings thus provided and then used as a wedge to pry apart the said shanks, and the bend and burr of a fish-hook attached to the lower extremity of one of the shanks.

References Cited in the file of this patent

UNITED STATES PATENTS

| | | |
|---|---|---|
| 78,523 | Hathaway | June 2, 1868 |
| 821,544 | Scott | May 22, 1906 |
| 991,745 | Randal | May 9, 1911 |
| 1,324,109 | Dutes | Dec. 9, 1919 |
| 1,793,520 | Siptrott | Feb. 24, 1931 |
| 1,961,378 | Mitchell | June 5, 1934 |
| 2,754,613 | Rogers et al. | July 17, 1956 |
| 2,780,885 | Callahan | Feb. 12, 1957 |

FOREIGN PATENTS

| | | |
|---|---|---|
| 490,356 | Canada | Feb. 10, 1953 |